United States Patent
Pandya (10) Patent No.: US 12,261,683 B2
(45) Date of Patent: Mar. 25, 2025

(54) METHOD AND DEVICE FOR GENERATING VIDEO FILE, COMPUTER APPARATUS, AND STORAGE MEDIUM

(71) Applicant: GUANGDONG OPPO MOBILE TELECOMMUNICATIONS CORP., LTD., Guangdong (CN)

(72) Inventor: Chintan Pandya, Shenzhen (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 442 days.

(21) Appl. No.: 17/826,976

(22) Filed: May 27, 2022

(65) Prior Publication Data
US 2022/0286218 A1    Sep. 8, 2022

Related U.S. Application Data

(63) Continuation of application No. PCT/CN2020/123748, filed on Oct. 26, 2020.

(30) Foreign Application Priority Data

Nov. 27, 2019    (CN) .......................... 201911182848.X (51) Int. Cl.
| | | |
|---|---|---|
| *H04H 60/43* | (2008.01) | |
| *H04H 60/27* | (2008.01) | |
| (Continued) | | |

(52) U.S. Cl.
CPC .......... *H04H 60/27* (2013.01); *H04H 60/90* (2013.01); *H04N 21/4334* (2013.01); *H04N 21/4394* (2013.01)

(58) Field of Classification Search
CPC .......... G06T 7/194; G06T 7/20; G06T 13/00; G06T 7/70; H04N 5/77; H04N 21/6543;
(Continued)

(56) References Cited

U.S. PATENT DOCUMENTS

| | | |
|---|---|---|
| 2006/0227224 A1 | 10/2006 | Kawata et al. |
| 2012/0026327 A1 | 2/2012 | Jackson |
| (Continued) | | |

FOREIGN PATENT DOCUMENTS

| | | |
|---|---|---|
| CN | 1832354 A | 9/2006 |
| CN | 1867054 A | 11/2006 |
| (Continued) | | |

OTHER PUBLICATIONS

Extended European Search Report dated Jan. 3, 2023 received in European Patent pipton No. EP20891603.1.
(Continued)

*Primary Examiner* — Tu X Nguyen
(74) *Attorney, Agent, or Firm* — Sheppard, Mullin, Richter & Hampton LLP (57) ABSTRACT

Embodiments of the present disclosure provide a method and device for generating a video file, a computer apparatus, and a storage medium. The method includes: obtaining a video-recording instruction, and recording a current picture on a recording interface according to the video-recording instruction; scanning an audio stream broadcasted to a predetermined channel by an audio device; in response to the scanned audio stream meeting a predetermined condition, determining the scanned audio stream to be a target audio stream, and displaying prompt information on the recording interface; and in response to receiving an operation of selecting the target audio stream according to the prompt information, combining the selected target audio stream and the recorded current picture to obtain a video file.

15 Claims, 2 Drawing Sheets

(51) Int. Cl.
*H04H 60/90* (2008.01)
*H04N 21/433* (2011.01)
*H04N 21/439* (2011.01)

(58) Field of Classification Search
CPC ............ H04N 21/422; H04N 21/2343; H04N 21/4363; H04N 5/253; G11B 5/09; H04H 60/58; H04H 20/95; H04H 60/43; H04M 11/08; H04M 1/72439; H04M 3/487; H04M 1/656; H04M 1/27; H04M 15/06
See application file for complete search history.

(56) References Cited

U.S. PATENT DOCUMENTS

| | | | |
|---|---|---|---|
| 2013/0044996 | A1 | 2/2013 | Bhogal et al. |
| 2015/0128174 | A1 | 5/2015 | Rango et al. |
| 2015/0296247 | A1* | 10/2015 | Glasser .............. H04N 21/4325 725/74 |
| 2016/0119656 | A1 | 4/2016 | Jackson |
| 2017/0092323 | A1* | 3/2017 | Goldman ............. G11B 27/031 |
| 2019/0149762 | A1 | 5/2019 | Pollack |

FOREIGN PATENT DOCUMENTS

| | | | |
|---|---|---|---|
| CN | 102065144 | A | 5/2011 |
| CN | 102119420 | A | 7/2011 |
| CN | 105959776 | A | 9/2016 |
| CN | 106604113 | A | 4/2017 |
| CN | 106817551 | A | 6/2017 |
| CN | 108388649 | A | 8/2018 |
| CN | 110035247 | A | 7/2019 |
| JP | 2009055551 | A * | 3/2009 |
| WO | 2018113083 | A1 | 6/2018 |

OTHER PUBLICATIONS

First Examination Report (FER) dated Nov. 24, 2022 received in Indian Patent Application No. IN202227036679. English translation included.
International Search Report and Written Opinion dated Jan. 27, 2021 in International Application No. PCT/CN2020/123748. English translation attached.
First Office Action from corresponding Chinese Application No. 201911182848.X, dated Sep. 14, 2021. English translation attached.
The Second Office Action from corresponding Chinese Application No. 201911182848.X, dated Jan. 6, 2022. English translation attached.
The Grant Notice from corresponding Chinese Application No. 201911182848.X, dated Apr. 20, 2022. English translation attached.
An, Xin, Tianjin University, "An Audio Classification Algorithm for News Video Retrieval", "China Master's Theses Full-text Database Information Science and Technology", China Academic Journal Electronic Publishing House. Apr. 15, 2009, full text, 67 pages.

* cited by examiner

METHOD AND DEVICE FOR GENERATING VIDEO FILE, COMPUTER APPARATUS, AND STORAGE MEDIUM

CROSS-REFERENCE TO RELATED APPLICATION

The present application is a continuation of International Patent Application No. PCT/CN2020/123748, filed on Oct. 26, 2020, which is based on and claims priority to Chinese Patent Application No. 201911182848.X, filed on Nov. 27, 2019, the entire contents of which are incorporated herein by reference.

TECHNICAL FIELD

The present disclosure relates to the field of computer technology, and more particularly, to a method and device for generating a video file, a computer apparatus, and a storage medium.

BACKGROUND

With the rapid development of Internet technology, users use terminal devices to record videos more and more frequently. For example, when participating in a concert, a user can use a terminal device to record the scene of the concert, and then generate a video file. A traditional video recording method is to collect video data by a built-in camera device of the terminal, and collect audio data by a built-in microphone device of the terminal. The terminal combines the video data and the audio data together to generate a video file. If there is a lot of ambient noise in a video-recording location where the user is located, there will be environmental noise in the video file generated by the traditional method, resulting in poor quality of the generated video file.

SUMMARY

Embodiments of the present disclosure provide a method and device for generating a video file, a computer apparatus and a storage medium capable of improving the quality of the video file.

Embodiments of the present disclosure provide a method for generating a video file, and the method includes: obtaining a video-recording instruction, and recording a current picture on a recording interface based on the video-recording instruction; scanning an audio stream broadcasted to a predetermined channel by an audio device; in response to the scanned audio stream meeting a predetermined condition, determining the scanned audio stream to be a target audio stream, and displaying prompt information on the recording interface; and in response to receiving an operation of selecting the target audio stream based on the prompt information, combining the selected target audio stream with the recorded current picture to obtain a video file.

Embodiments of the present disclosure provide a device for generating a video file and the device includes a recording module, a scanning module, a determining module, and a combining module. The recording module is configured to obtain a video-recording instruction, and record a current picture on a recording interface based on the video-recording instruction. The scanning module is configured to scan an audio stream broadcasted to a predetermined channel by an audio device. The determining module is configured to determine the scanned audio stream to be a target audio stream and display prompt information on the recording interface, in response to the scanned audio stream meeting a predetermined condition. The combining module is configured to combine the selected target audio stream with the recorded current picture to obtain a video file, in response to receiving an operation of selecting the target audio stream based on the prompt information.

Embodiments of the present disclosure provide a computer apparatus, the computer apparatus includes a memory and a processor, the memory has a computer program stored thereon, the computer program being executable on the processor, and the processor, when executing the computer program, implements steps of any one of the above method embodiments.

Embodiments of the present disclosure provide a computer-readable storage medium, having a computer program stored thereon. The computer program, when executed by a processor, implements steps of any one of the above method embodiments.

The method and device for generating a video file, the computer apparatus, and the storage medium in the embodiments of the present disclosure scan an audio stream broadcasted to a predetermined channel by an audio device when recording a current picture on a recording interface, and because there is no environmental noise in the audio stream broadcasted in the predetermined channel, a target audio stream with better quality can be obtained. When an audio stream meeting a predetermined condition is scanned, the scanned audio stream is identified as a target audio stream, and prompt information is displayed on the recording interface to prompt the user that the target audio stream meeting the predetermined condition has been scanned so that the user can make selection. When receiving an operation of selecting the target audio stream based on the prompt information, the selected target audio stream is combined with the recorded current picture to obtain a video file. The target audio stream with better quality can be used as an input audio in the video recording, thus improving the quality of the video file.

DESCRIPTION OF EMBODIMENTS

In order to make the purposes, technical solutions and advantages of the embodiments of the present disclosure clearer, the embodiments of the present disclosure are described in further detail below in combination with the figures and embodiments. It should be understood that the specific embodiments described herein are only used to explain the present disclosure, but not to limit the present disclosure.

Figure 1:
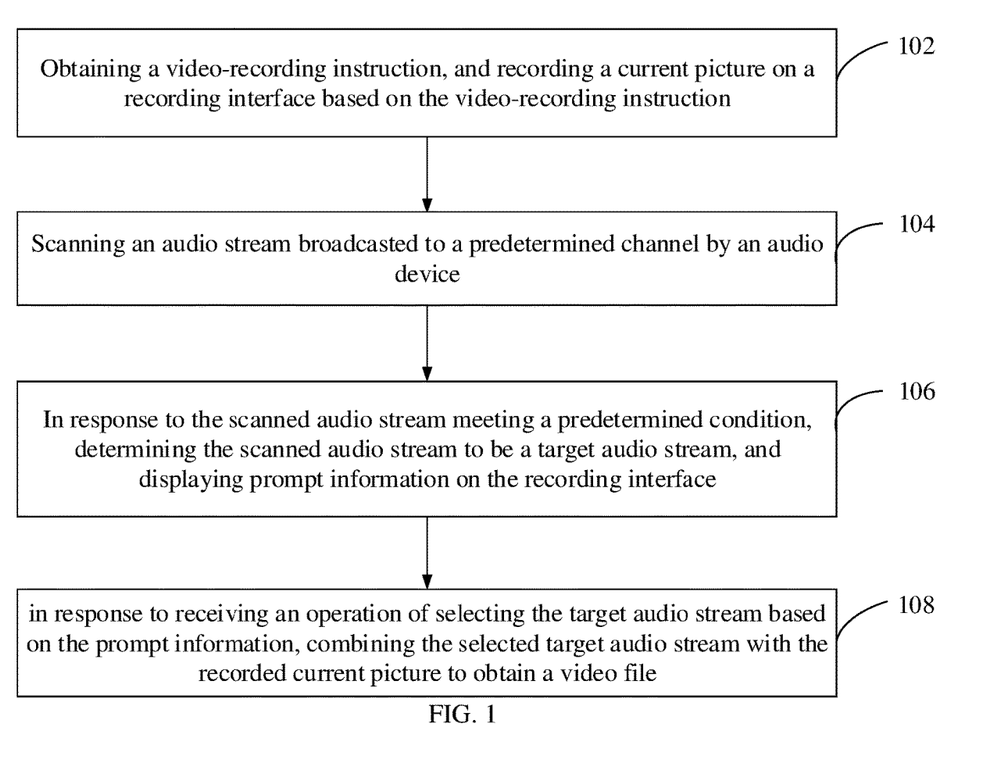
FIG. 1 is a schematic flowchart of a method for generating a video file in an embodiment of the disclosure.

As illustrated in FIG. 1, an embodiment of the present disclosure provides a method for generating a video file. Taking the method being applied to a terminal as an example, the method includes the following steps:

step 102, obtaining a video-recording instruction, and recording a current picture on a recording interface based on the video-recording instruction;

step 104, scanning an audio stream broadcasted to a predetermined channel by an audio device;

step 106, in response to the scanned audio stream meeting a predetermined condition, determining the scanned audio stream to be a target audio stream, and displaying prompt information on the recording interface; and step 108, in response to receiving an operation of selecting the target audio stream based on the prompt information, combining the selected target audio stream and the recorded current picture to obtain a video file.

A video-recording application is provided in a terminal in advance. When detecting that the user's video-recording application is started, the terminal displays a recording interface. In response to obtaining the video-recording instruction triggered by the user, the terminal records the current picture on the recording interface based on the video-recording instruction. Exemplarily, the current picture may be a live picture of an event. For example, the current picture may be a live concert picture. The terminal can be connected to the audio device by a wireless-communication manner, and receive an audio stream broadcasted to a predetermined channel by an audio device through a wireless connection. Exemplarily, the audio device may be an audio mixer. The audio device is used to collect the audio stream, transcode and encapsulate the audio stream into an audio stream of a specified format, and broadcast the encapsulated audio stream to the predetermined channel. The audio stream collected by the audio device can be a raw audio without environmental noise. Exemplarily, the audio stream may be a real-time audio stream. Exemplarily, the wireless-communication manner may include one of various manners such as FM broadcasting, Wireless Fidelity (WiFi), and Internet.

In some optional embodiments, the predetermined channel may include a predetermined FM radio channel and a predetermined audio path. The audio device can select the corresponding predetermined channel by a wireless-connection manner. The audio device can broadcast the audio stream in various ways. Exemplarily, when the wireless-communication manner is FM broadcasting, the audio device can broadcast the audio stream to the predetermined FM radio channel through FM broadcasting. When the wireless communication manner is an Internet, the audio device can broadcast the audio stream to the predetermined audio path by the Internet.

The terminal scans the received audio stream, and determines the scanned audio stream as a target audio stream in response to the scanned audio stream meeting a predetermined condition. Exemplarily, the predetermined condition may be selected based on the predetermined channel, and different predetermined channels may correspond to different predetermined conditions. For example, when the predetermined channel is a predetermined FM radio channel, the predetermined condition may be that a frequency band of the scanned audio stream is consistent with a predetermined frequency band of the predetermined FM radio channel. For another example, when the predetermined channel is a predetermined audio path, the predetermined condition may be that an audio path of the scanned audio stream is consistent with current location information. The current location information may be a location information of current video recording.

When scanning a target audio stream meeting the predetermined condition, the terminal may generate a prompt information based on the target audio stream, and display the prompt information in a predetermined region of a recording interface. A plurality of target audio streams meeting the predetermined condition may be present. The terminal displays the prompt information in the predetermined region of the recording interface of the terminal so that the user selects the target audio stream. The prompt information is used to prompt the user to select the corresponding target audio stream from a plurality of target audio streams meeting the predetermined condition as an audio source in the video recording. When receiving the user's operation of selecting the target audio stream based on the prompt information, the terminal configures the target audio stream selected by the user as an input audio in the video recording. The terminal combines the configured input audio with the recorded current picture to obtain a video file.

In an embodiment, the method mentioned above further includes: obtaining an audio file in response to the scanned audio stream not meeting the predetermined condition; and combining the audio file with the recorded current picture to obtain a video file.

In this embodiment, in the process of the terminal scanning the audio streams broadcasted to a predetermined channel by the audio device, when the scanned audio streams do not meet the predetermined condition, the terminal can also obtain an audio file sent by the audio device. Exemplarily, the terminal may be connected to the audio device by Bluetooth, so that an audio file transmitted by the audio device can be obtained when there is no target audio stream that meets the predetermined condition among the scanned audio streams. The terminal combines the obtained audio file with the recorded current picture. Exemplarily, the audio file may include audio time. The recorded current picture may include picture time. The terminal extracts an audio clip corresponding to the picture time from the audio file based on the audio time of the audio file and the picture time. The terminal combines the audio clip corresponding to the picture time with the recorded current picture to obtain a video file.

The present embodiment can obtain an audio file when none of the audio streams broadcasted in the predetermined channel meets the predetermined condition, and then combine the audio file and the recorded current picture to obtain a video file, thus improving the flexibility of the video-file generation mode.

Optionally, the terminal can identify an audio category corresponding to the selected target audio stream before combining the selected target audio stream and the recorded current picture. Exemplarily, the terminal obtains audio-feature information by performing a feature extraction on the selected target audio stream; calls a trained classifier and inputs the audio-feature information into the trained classifier; and performs a prediction operation on the audio-feature information through the train classifier and outputs an audio category corresponding to the audio-feature information. The audio category corresponding to the audio-feature information may include a speech and music. A pre-trained classifier may be stored on the terminal, and the classifier may be a classification model constructed after pre-training with a large number of audio streams (also referred to as training data). For example, the classifier can be a Back Propagation (BP) neural network model.

When the identified audio category is a speech, the terminal can identify an end of the speech in the audio stream based on historical data. The terminal can use the end of the speech as a split point of the audio stream. The terminal ignores the identified speech based on the split point of the audio stream. When the identified audio category is music, the terminal can configure the selected target audio stream as an input audio in the video recording, and then combine the configured input audio with the recorded current picture to obtain a video file in which the recorded picture matches the input audio.

By identifying the audio category corresponding to the selected audio stream, the terminal can classify the selected audio stream on a time axis, and ignore the audio category that does not match the recorded picture, thus improving the validity of the video file.

In a traditional way, a terminal collects video data by a built-in camera device, and collects audio data by a built-in microphone device. The terminal combines the video data and the audio data together to generate a video file. When a lot of environmental noise exists in the video recording location where the user is located, there will be environmental noise in a video file generated by the traditional way, which results in poor quality of the generated video file.

In the present embodiment, the terminal scans audio streams broadcasted to a predetermined channel by an audio device when recording a current picture on a recording interface, and because there is no environmental noise in the audio streams broadcasted in the predetermined channel, a target audio stream with better quality can be obtained. When an audio stream meeting a predetermined condition is scanned, the terminal determines the scanned audio stream as the target audio stream, and displays prompt information on the recording interface to prompt the user that the target audio stream meeting the predetermined condition has been scanned so that the user can make selection. When receiving the operation of selecting the target audio stream according to the prompt information, the terminal combines the selected target audio stream with the recorded current picture to obtain a video file. The target audio stream with better quality can be used as an input audio in the video recording, thus improving the quality of the video file.

Figure 2:
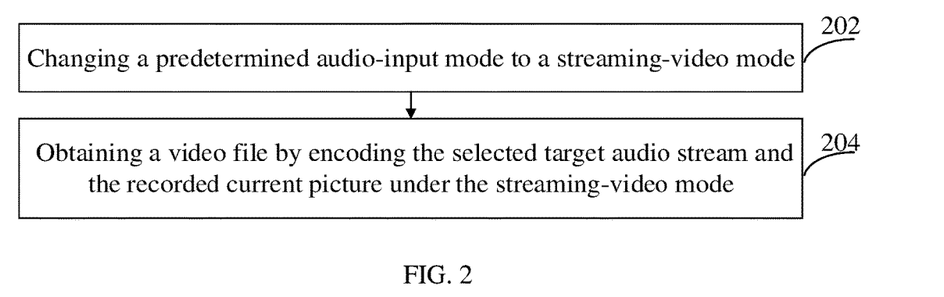
FIG. 2 is a schematic flowchart of steps for combining a selected target audio stream with a recorded current picture to obtain a video file in an embodiment of the disclosure.

In an embodiment, as shown in FIG. 2, the step of combining the selected target audio stream and the recorded current picture to obtain the video file includes:
    step 202, changing a predetermined audio-input mode into a streaming-video mode; and
    step 204, obtaining a video file by encoding the selected target audio stream and the recorded current picture under the streaming-video mode.

In the present embodiment, when receiving an operation of selecting the target audio stream according to the prompt information, the terminal may change a predetermined audio-input mode to a streaming-video mode, so as to configure the target audio stream selected by user into an input audio in video recording. Specifically, a sound track of a streaming-video mode is provided in the terminal in advance. The terminal closes a sound track corresponding to the predetermined audio-input mode and opens the sound track corresponding to the streaming-video mode, so as to switch the audio-input mode. The predetermined audio-input mode of the terminal can be a built-in-microphone input mode. The terminal performs a video encoding on the selected target audio stream based on the recorded current picture under the streaming-video mode, and synchronously combines the selected target audio stream and the recorded current picture to obtain a video file.

In the present embodiment, by changing the predetermined audio-input mode to the streaming-video mode, the terminal can avoid the problem of environmental noise in the recording in the predetermined audio-input mode, thus solves the influence of environmental noise from source, improves the quality of the audio data, and in turn improves the quality of the video file.

In an embodiment, said scanning the audio stream broadcasted to the predetermined channel by the audio device includes: scanning an audio stream broadcasted to a predetermined FM radio channel by the audio device, and identifying whether a frequency band of the audio stream broadcasted in the FM radio channel is consistent with a predetermined frequency band. When the frequency band of the audio stream broadcasted in the FM radio channel is consistent with the predetermined frequency band, the scanned audio stream meets the predetermined condition.

In this embodiment, the audio device can broadcast an audio stream in a variety of manners. When the broadcasting manner is different, the predetermined channel corresponding to the audio stream can be different. For example, when the broadcasting manner is FM broadcasting, the audio device can broadcast the audio stream to the predetermined FM radio channel by FM broadcasting. The predetermined FM radio channel may have a local frequency band preset therein. When the frequency band of the audio stream broadcasted in the FM radio channel is consistent with the local frequency band, the scanned audio stream meets the predetermined condition. For example, the local frequency band can be preset to 85.5 MHz. When scanning the audio stream broadcasted to the predetermined FM radio channel by the audio device, the terminal identifies whether the audio stream in the predetermined FM radio channel is 85.5 MHz, and if the frequency band of the audio stream broadcasted in the FM radio channel is 85.5 MHz, the scanned audio stream meets the predetermined condition.

In this embodiment, the terminal can quickly identify the target audio stream meeting the predetermined condition by scanning audio streams broadcasted to the predetermined FM radio channel by the audio device and identifying whether the frequency bands are consistent.

In an embodiment, said scanning the audio stream broadcasted to the predetermined channel by the audio device includes: scanning an audio stream broadcasted to a predetermined audio path by the audio device; obtaining current location information, and identifying whether the current location information is consistent with an audio path corresponding to the scanned audio stream. When the current location information is consistent with the audio path corresponding to the scanned audio stream, the scanned audio stream meets the predetermined condition.

In this embodiment, when the audio device adopts a different broadcasting manner, the predetermined channel corresponding to the audio stream may be different. When the broadcasting manner of the audio device is Internet, the audio device can broadcast audio streams to the predetermined audio path by the Internet. And the terminal can obtain the corresponding audio stream from the Internet through the predetermined audio path.

The terminal can obtain the current location information in various ways, for example by a Global Positioning System (GPS) positioning device. A base station signal can be obtained by a base station positioning device, so as to obtain the current location information. The current location information may be location information of the current video recording. The terminal identifies whether the current location information is consistent with the audio path corresponding to the scanned audio stream. When the current location information is consistent with the audio path corresponding to the scanned audio stream, the scanned audio stream meets the predetermined condition.

In this embodiment, the terminal obtains the current location information by scanning the audio stream broadcasted to the predetermined audio path by the audio device, and obtaining current location information, and when the current location information is consistent with the audio path corresponding to the scanned audio stream, a target audio stream meeting the predetermined condition is obtained. By scanning the predetermined channel corresponding to the broadcast manner, the comprehensiveness of audio-stream scanning is improved, which is beneficial to obtain the target audio stream meeting the predetermined condition.

In an embodiment, the method includes, prior to scanning the audio stream broadcasted to the predetermined channel by the audio device: obtaining a wireless-connection request transmitted by the audio device; and performing a wireless connection with the audio device based on the wireless-connection request, and receiving the audio stream broadcasted to the predetermined channel by the audio device.

In this embodiment, prior to scanning the audio stream broadcasted to the predetermined channel by the audio device, the terminal may receive the audio stream broadcasted to the predetermined channel by the audio device. Exemplarily, the terminal establishes a wireless connection with the audio device according to a wireless-connection request transmitted by the audio device. The audio device may be an audio mixer. The audio device is used to collect an audio stream, transcode and encapsulate the audio stream into an audio stream of a specified format, and broadcast the encapsulated audio stream to the predetermined channel. The audio stream collected by the audio device can be raw audio without environmental noise. The audio stream may be a real-time audio stream. The wireless-connection request may include a wireless connection manner. The wireless connection manner can include FM broadcasting, WiFi, Internet, and other manners.

In some optional embodiments, the wireless connection manner of the terminal and the audio device may be the same as the manner in which the audio device broadcasts audio streams. For example, when the audio device broadcasts audio streams to a FM radio channel by FM broadcasting, the terminal can establish a connection with the audio device through FM broadcasting, to receive audio streams broadcasted in the FM radio channel. When the audio device broadcasts audio streams to a predetermined audio path through Internet, the terminal can establish a connection with the audio device through the Internet, to receive audio streams broadcasted in the predetermined audio path.

In this embodiment, the terminal establishes a wireless connection with the audio device to receive audio streams broadcasted to the predetermined channel by the audio device, which facilitates subsequent audio-stream scanning to obtain the target audio stream meeting the predetermined condition.

It should be understood that although the steps in the flowcharts of FIG. 1 and FIG. 2 are illustrated in sequence according to the arrows, these steps are not necessarily executed in the sequence shown by the arrows. Unless explicitly stated herein, the execution of these steps is not strictly limited to an order, but can be executed in other orders. Moreover, at least a part of the steps in FIG. 1 and FIG. 2 may include multiple sub-steps or multiple stages, which are not necessarily executed at the same time, but may be executed at different times. Execution orders of these sub-steps or stages are not necessarily sequential, but may be executed in turn or alternately with other steps or at least a part of sub-steps or stages of other steps.

Figure 3:
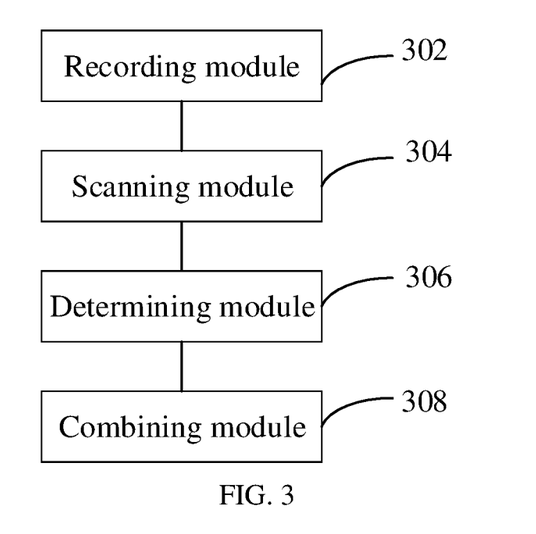
FIG. 3 is a structural block diagram of a device for generating a video file in an embodiment of the disclosure.

As illustrated in FIG. 3, embodiments of the present disclosure further provide a device for generating a video file, including a recording module 302, a scanning module 304, a determining module 306, and a combining module 308.

The recording module 302 is configured to obtain a video-recording instruction, and record a current picture on a recording interface based on the video-recording instruction.

The scanning module 304 is configured to scan an audio stream broadcasted to a predetermined channel by the audio device.

The determining module 306 is configured to determine the scanned audio stream to be a target audio stream and display prompt information on the recording interface, in response to the scanned audio stream meeting a predetermined condition;

The combining module 308 is configured to: in response to receiving an operation of selecting the target audio stream based on the prompt information, combine the selected target audio stream with the recorded current picture to obtain a video file.

In an embodiment, the combining module 308 is further configured to change a predetermined audio-input mode to a streaming-video mode, and obtain a video file by encoding the selected target audio stream and the recorded current picture under the streaming-video mode.

In an embodiment, the scanning module 304 is further configured to scan an audio stream broadcasted to a predetermined FM radio channel by the audio device, and identify whether a frequency band of the audio stream broadcasted in the FM radio channel is consistent with a predetermined frequency band. When the frequency band of the audio stream broadcasted in the FM radio channel is consistent with the predetermined frequency band, the scanned audio stream meets the predetermined condition.

In an embodiment, the scanning module 304 is further configured to scan an audio stream broadcasted to a predetermined audio path by the audio device; and obtain current location information, and identify whether the current location information is consistent with an audio path corresponding to the scanned audio stream. When the current location information is consistent with the audio path corresponding to the scanned audio stream, the scanned audio stream meets the predetermined condition.

In an embodiment, the above device further includes a connecting module configured to obtain a wireless-connection request transmitted by the audio device; and perform a wireless connection with the audio device based on the wireless-connection request, and receive the audio stream broadcasted to the predetermined channel by the audio device.

In an embodiment, the above device further includes an obtaining module configured to obtain an audio file in response to the scanned audio stream not meeting the predetermined condition, and the combining module 308 is further configured to combine the audio file with the recorded current picture to obtain a video file.

The specific limitations on the device for generating the video file can refer to the limitations on the method for generating the video file above, which will not be repeated here. All or part of various modules in the above device for generating the video file can be implemented by software, hardware, or a combination of software and hardware. The modules above can be in the form of hardware embedded in or independent of the processor in a computer apparatus, or in the form of software stored in the memory of a computer apparatus, so that the processor can call and execute operations corresponding to the modules above.

Figure 4:
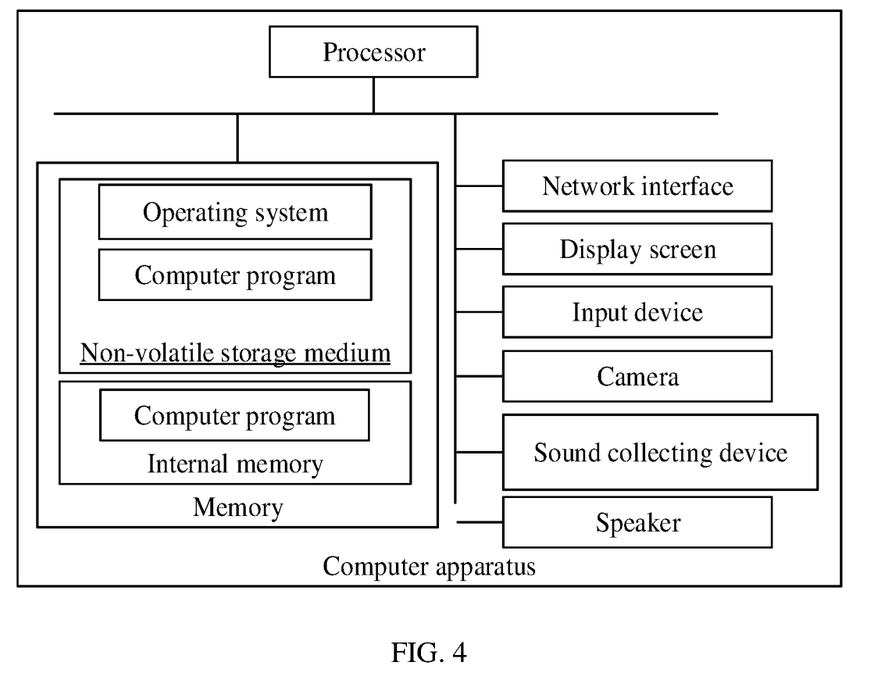
FIG. 4 is an internal structure diagram of a computer apparatus in an embodiment of the disclosure.

Embodiments of the present disclosure also provide a computer apparatus, which may be a server or a terminal, and an internal structure diagram thereof may be as illustrated in FIG. 4. The computer apparatus includes a processor, a memory, a network interface, an input device, a camera, a sound collecting device, a speaker, and a display screen, which are connected by a system bus. Among them, the processor of the computer apparatus is used to provide computing and control capabilities. The memory of the computer apparatus includes a non-volatile storage medium and an internal memory. The non-volatile storage medium has an operating system, a computer program, and a database stored thereon. The internal memory provides an environment for running of the operating system and computer program in the non-volatile storage medium. The database of the computer apparatus is used to store video files. The network interface of the computer apparatus is used to communicate with an external terminal by a network connection. The computer program, when executed by the processor, implements the method for generating the video file according to the above-mentioned embodiment of the present disclosure.

Those skilled in the art can understand that the structure illustrated in FIG. 4 is only a block diagram of part of the structures related to the embodiments of the present disclosure, and does not constitute a limitation on the computer apparatus to which the embodiments of the present disclosure are applied. A specific computer apparatus may include more or fewer components than those shown in the figures, or combine some components, or have a different arrangement of components.

In an embodiment, the processor, when executing the computer program, implements the following steps of: obtaining a video-recording instruction, and recording a current picture on a recording interface based on the video-recording instruction; scanning an audio stream broadcasted to a predetermined channel by an audio device; in response to the scanned audio stream meeting a predetermined condition, determining the scanned audio stream to be a target audio stream, and displaying prompt information on the recording interface; and in response to receiving an operation of selecting the target audio stream based on the prompt information, combining the selected target audio stream with the recorded current picture to obtain a video file.

In an embodiment, the processor, when executing the computer program, further implements the following steps of: changing a predetermined audio-input mode to a streaming-video mode, and obtaining a video file by encoding the selected target audio stream and the recorded current picture under the streaming-video mode.

In an embodiment, the processor, when executing the computer program, further implements the following steps of: scanning an audio stream broadcasted to a predetermined FM radio channel by the audio device; and identifying whether a frequency band of the audio stream broadcasted in the FM radio channel is consistent with a predetermined frequency band. When the frequency band of the audio stream broadcasted in the FM radio channel is consistent with the predetermined frequency band, the scanned audio stream meets the predetermined condition.

In an embodiment, the processor, when executing the computer program, further implements the following steps of: scanning an audio stream broadcasted to a predetermined audio path by the audio device; and obtaining current location information, and identifying whether the current location information is consistent with an audio path corresponding to the scanned audio stream. When the current location information is consistent with the audio path corresponding to the scanned audio stream, the scanned audio stream meets the predetermined condition.

In an embodiment, the processor, when executing the computer program, further implements the following steps of: obtaining a wireless-connection request transmitted by the audio device; and performing a wireless connection with the audio device based on the wireless-connection request, and receiving the audio stream broadcasted to the predetermined channel by the audio device.

In an embodiment, the processor, when executing the computer program, further implements the following steps of: obtaining an audio file in response to the scanned audio stream not meeting the predetermined condition; and combining the audio file with the recorded current picture to obtain a video file.

Embodiments of the present disclosure also provide a computer-readable storage medium having a computer program stored thereon. The computer program, when executed by a processor, implements the following steps of: obtaining a video-recording instruction, and recording a current picture on a recording interface based on the video-recording instruction; and scanning an audio stream broadcasted to a predetermined channel by an audio device; in response to the scanned audio stream meeting a predetermined condition, determining the scanned audio stream to be a target audio stream, and displaying prompt information on the recording interface; and in response to receiving an operation of selecting the target audio stream based on the prompt information, combining the selected target audio stream with the recorded current picture to obtain a video file.

In an embodiment, the computer program, when executed by the processor, further implements the following steps of: changing a predetermined audio-input mode to a streaming-video mode, and obtaining a video file by encoding the selected target audio stream and the recorded current picture under the streaming-video mode.

In an embodiment, the computer program, when executed by the processor, further implements the following steps of: scanning an audio stream broadcasted to a predetermined FM radio channel by the audio device; and identifying whether a frequency band of the audio stream broadcasted in the FM radio channel is consistent with a predetermined frequency band. When the frequency band of the audio stream broadcasted in the FM radio channel is consistent with the predetermined frequency band, the scanned audio stream meets the predetermined condition.

In an embodiment, the computer program, when executed by the processor, further implements the following steps of: scanning an audio stream broadcasted to a predetermined audio path by the audio device; and obtaining current location information, and identifying whether the current location information is consistent with an audio path corresponding to the scanned audio stream. When the current location information is consistent with the audio path corresponding to the scanned audio stream, the scanned audio stream meets the predetermined condition.

In an embodiment, the computer program, when executed by the processor, further implements the following steps of: obtaining a wireless-connection request transmitted by the audio device; and performing a wireless connection with the audio device based on the wireless-connection request, and receiving the audio stream broadcasted to the predetermined channel by the audio device.

In an embodiment, the computer program, when executed by the processor, further implements the following steps of: obtaining an audio file in response to the scanned audio stream not meeting the predetermined condition; and combining the audio file with the recorded current picture to obtain a video file.

Those of ordinary skilled in the art can understand that all or part of the processes in the methods of the above embodiments can be implemented by a computer program instructing relevant hardware, and the computer program can be stored in a non-volatile computer-readable storage medium. When executed, the computer program may include the processes of the above-mentioned method embodiments. Any reference to a memory, storage, database or other medium used in the embodiments provided in this disclosure may include non-volatile and/or volatile memory. The non-volatile memory may include Read Only Memory (ROM), Programmable Read-Only Memory (PROM), Erasable Programmable Read-Only Memory (EPROM), Electrically Erasable Programmable Read-Only Memory (EEPROM) or flash memory. The volatile memory may include Random Access Memory (RAM) or external cache memory. As illustration but not limitation, the RAM is available in various forms, such as Static Random Access Memory (SRAM), Dynamic Random Access Memory (DRAM), Synchronous Dynamic Random Access Memory (SDRAM), Double Data Rate Synchronous Dynamic Random Access Memory (DDRSDRAM), Enhanced Synchronous Dynamic Random Access Memory (ESDRAM), SyncLink Dynamic Random Access Memory (SLDRAM), Rambus direct RAM (RDRAM), Direct Rambus direct RAM (DRDRAM), and Rambus dynamic RAM (RDRAM), etc.

The methods disclosed in the several method embodiments provided in the present disclosure can be combined arbitrarily without conflict to obtain new method embodiments.

The features disclosed in the several product embodiments provided in the present disclosure can be combined arbitrarily without conflict to obtain new product embodiments.

The features disclosed in several method or device embodiments provided in the present disclosure can be combined arbitrarily without conflict to obtain new method embodiments or device embodiments.

The technical features of the above embodiments can be combined arbitrarily. In order to make the description simple, not all possible combinations of the technical features in the above embodiments are described. However, the combination of these technical features is considered to be within the scope of this specification, as long as it has no contradiction.

The above embodiments merely illustrate several implementation manners of the present disclosure, the description thereof is specific and detailed, but the scope of the present disclosure is not limited to these embodiments. It should be noted that various variants and improvements can be made by those skilled in the art without departing from the ideas of the embodiments of the present disclosure, and these variants and improvements are all encompassed by the scope of present disclosure. Therefore, the patent protection scope of the present disclosure is defined by the claims as attached.

What is claimed is:

1. A method for generating a video file, comprising:

obtaining a video-recording instruction, and recording a current picture on a recording interface based on the video-recording instruction; and scanning an audio stream broadcasted to a predetermined channel by an audio device; and in response to the scanned audio stream meeting a predetermined condition, determining the scanned audio stream to be a target audio stream, and displaying prompt information on the recording interface; and in response to receiving an operation of selecting the target audio stream based on the prompt information, combining the selected target audio stream with the recorded current picture to obtain a video file, wherein said combining the selected target audio stream with the recorded current picture to obtain a video file comprises:

changing a predetermined audio-input mode to a streaming-video mode; and obtaining a video file by encoding the selected target audio stream and the recorded current picture under the streaming-video mode.

2. The method according to claim 1, wherein said scanning an audio stream broadcasted to a predetermined channel by an audio device comprises:

scanning an audio stream broadcasted to a predetermined Frequency Modulation (FM) radio channel by the audio device; and identifying whether a frequency band of the audio stream broadcasted in the FM radio channel is consistent with a predetermined frequency band, wherein when the frequency band of the audio stream broadcasted in the FM radio channel is consistent with the predetermined frequency band, the scanned audio stream meets the predetermined condition.

3. The method according to claim 1, wherein said scanning an audio stream broadcasted to a predetermined channel by an audio device comprises:

scanning an audio stream broadcasted to a predetermined audio path by the audio device; and obtaining current location information, and identifying whether the current location information is consistent with an audio path corresponding to the scanned audio stream, wherein when the current location information is consistent with the audio path corresponding to the scanned audio stream, the scanned audio stream meets the predetermined condition.

4. The method according to claim 1, further comprising, prior to said scanning an audio stream broadcasted to a predetermined channel by an audio device:

obtaining a wireless-connection request transmitted by the audio device; and performing a wireless connection with the audio device based on the wireless-connection request, and receiving the audio stream broadcasted to the predetermined channel by the audio device.

5. The method according to claim 1, further comprising:

obtaining an audio file in response to the scanned audio stream not meeting the predetermined condition; and combining the audio file with the recorded current picture to obtain a video file.

6. A computer apparatus, comprising a memory and a processor, wherein the memory has a computer program stored thereon, the computer program being executable on the processor, and the processor, when executing the computer program, implements the method according to claim 1.

7. The computer apparatus according to claim 6, wherein the processor, when executing the computer program, further implements steps of:
scanning an audio stream broadcasted to a predetermined Frequency Modulation (FM) radio channel by the audio device; and
identifying whether a frequency band of the audio stream broadcasted in the FM radio channel is consistent with a predetermined frequency band,
wherein when the frequency band of the audio stream broadcasted in the FM radio channel is consistent with the predetermined frequency band, the scanned audio stream meets the predetermined condition.

8. The computer apparatus according to claim 6, wherein the processor, when executing the computer program, further implements steps of:
scanning an audio stream broadcasted to a predetermined audio path by the audio device; and
obtaining current location information, and identifying whether the current location information is consistent with an audio path corresponding to the scanned audio stream,
wherein when the current location information is consistent with the audio path corresponding to the scanned audio stream, the scanned audio stream meets the predetermined condition.

9. The computer apparatus according to claim 6, wherein the processor, when executing the computer program, further implements steps of:
obtaining a wireless-connection request transmitted by the audio device; and
performing a wireless connection with the audio device based on the wireless-connection request, and receiving the audio stream broadcasted to the predetermined channel by the audio device.

10. The computer apparatus according to claim 6, wherein the processor, when executing the computer program, further implements steps of:
obtaining an audio file in response to the scanned audio stream not meeting the predetermined condition; and
combining the audio file with the recorded current picture to obtain a video file.

11. A non-volatile computer-readable storage medium, having a computer program stored thereon, wherein the computer program, when executed by a processor, implements the method according to claim 1.

12. The non-volatile computer-readable storage medium according to claim 11, wherein the computer program, when executed by the processor, further implements steps of:
scanning an audio stream broadcasted to a predetermined Frequency Modulation (FM) radio channel by the audio device; and
identifying whether a frequency band of the audio stream broadcasted in the FM radio channel is consistent with a predetermined frequency band,
wherein when the frequency band of the audio stream broadcasted in the FM radio channel is consistent with the predetermined frequency band, the scanned audio stream meets the predetermined condition.

13. The non-volatile computer-readable storage medium according to claim 11, wherein the computer program, when executed by the processor, further implements steps of:
scanning an audio stream broadcasted to a predetermined audio path by the audio device; and
obtaining current location information, and identifying whether the current location information is consistent with an audio path corresponding to the scanned audio stream,
wherein when the current location information is consistent with the audio path corresponding to the scanned audio stream, the scanned audio stream meets the predetermined condition.

14. The non-volatile computer-readable storage medium according to claim 11, wherein the computer program, when executed by the processor, further implements steps of:
obtaining a wireless-connection request transmitted by the audio device; and
performing a wireless connection with the audio device based on the wireless-connection request, and receiving the audio stream broadcasted to the predetermined channel by the audio device.

15. The non-volatile computer-readable storage medium according to claim 11, wherein the computer program, when executed by the processor, further implements steps of:
obtaining an audio file in response to the scanned audio stream not meeting the predetermined condition; and
combining the audio file with the recorded current picture to obtain a video file.

* * * * *